United States Patent
Busaba et al.

(10) Patent No.: US 7,434,035 B2
(45) Date of Patent: Oct. 7, 2008

(54) METHOD AND SYSTEM FOR PROCESSING INSTRUCTIONS IN GROUPED AND NON-GROUPED MODES

(75) Inventors: Fadi Y. Busaba, Poughkeepsie, NY (US); Timothy J. Slegel, Staatsburg, NY (US)

(73) Assignee: International Business Machines Corporation, Armonk, NY (US)

( * ) Notice: Subject to any disclaimer, the term of this patent is extended or adjusted under 35 U.S.C. 154(b) by 1095 days.

(21) Appl. No.: 10/436,219

(22) Filed: May 12, 2003

(65) Prior Publication Data

US 2004/0230777 A1 Nov. 18, 2004

(51) Int. Cl.
*G06F 9/30* (2006.01)
(52) U.S. Cl. ............ 712/226; 712/228; 712/205; 712/208; 712/244; 712/233; 711/115
(58) Field of Classification Search ............ 712/226, 712/228, 205, 208, 244, 233; 711/115
See application file for complete search history.

(56) References Cited

U.S. PATENT DOCUMENTS

| | | | |
|---|---|---|---|
| 5,481,743 A * | 1/1996 | Baxter | 712/23 |
| 5,890,843 A * | 4/1999 | Bastick et al. | 405/259.1 |
| 5,983,337 A * | 11/1999 | Mahalingaiah et al. | 712/32 |
| 6,092,185 A * | 7/2000 | Slegel et al. | 712/219 |
| 6,161,166 A | 12/2000 | Doing et al. | |
| 6,178,495 B1 | 1/2001 | Slegel et al. | |

\* cited by examiner

*Primary Examiner*—Eddie P Chan
*Assistant Examiner*—Robert E Fennema
(74) *Attorney, Agent, or Firm*—Cantor Colburn LLP

(57) ABSTRACT

An embodiment of the invention is a processor for detecting one or more groups of instructions and initiating a processor action upon detecting one or more groups of instructions. The processor includes an instruction unit for fetching and decoding a group of instructions. An instruction register receives the group of instruction having at least one instruction opcode. A control register includes a control word including a control opcode and an action field defining a processor action. An execution unit includes compare logic for comparing the instruction opcode and the control opcode. The execution unit initiates the processor action upon the compare logic detecting a hit between the instruction opcode and the control opcode.

9 Claims, 5 Drawing Sheets

| DED | ADDRESS GENERATION | C1 (CACHE ACCESS) | C2 (CACHE RETURN) | EXECUTION (EX) | PUT AWAY (PA) |
|---|---|---|---|---|---|
| | INSTRUCTION GROUPING | DISPATCH (EM1) | GPR READ (E0) | | |

FIG. 2

| INSTRUCTION GROUP | | | | | | | | | | | |
|---|---|---|---|---|---|---|---|---|---|---|---|
| GROUP 0 | EM1 | E0 | EX | PA | | | | | | | |
| 1 | | EM1 | E0 | E1 | PA | | | | | | |
| 2 (R-pipe) | | | EM1 | E0 | EX | PA | | | | | |
| (S-pipe) | | | EM1 | E0 | EX | PA | — | | | | |
| (T-pipe) | | | EM1 | E0 | (EX) | EX | — | | | | |
| 3 | | | | EM1 | (E0) | E0 | PA | | | | |
| 4 | | | | | (EM1) | EM1 | E0 | EX | | | |
| 5 | | | | | | | (E0) | (E0) | EX | PA | |
| 6 | | | | | | | | EX | E0 | EX | EX |
| | | | | | | | | | gap | EM1 | EM1 |
| | | | | | | | | | | gap | E0 |
| | | | | | | | | | | | gap |

FIG. 3

METHOD AND SYSTEM FOR PROCESSING INSTRUCTIONS IN GROUPED AND NON-GROUPED MODES

BACKGROUND OF THE INVENTION

The invention relates to computer systems and in particular to processors that detect overlapping instruction groups and adjust processing in response.

The present application is related to the following co-pending patent application filed concurrently herewith:

U.S. patent application entitled METHOD AND SYSTEM FOR PROCESSING LOOP BRANCH INSTRUCTIONS.

These co-pending applications and the present application are owned by one and the same assignee, International Business Machines Corporation of Armonk, N.Y. The descriptions set forth in this co-pending application is hereby incorporated into the present application by reference.

Trademarks: IBM® is a registered trademark of International Business Machines Corporation, Armonk, N.Y., U.S.A. S/390, Z900 and z990 and other product names may be registered trademarks or product names of International Business Machines Corporation or other companies.

Existing computer systems detect a match between an opcode about to be executed and opcodes programmed into it by the computer manufacturer to alleviate design deficiencies in the processor. One such system is disclosed in U.S. Pat. No. 6,092,185, the entire contents of which are incorporated herein by reference. The system has a mechanism to send action(s) to be taken to the I-unit (Instruction fetch and decode unit)upon detection of a predefined opcode.

While well suited for its intended purpose, the prior system is only applicable to single scalar processors when only one instruction is issued. Upon detecting a predefined opcode, the actions taken are severe (serialization, force instruction to be executed in millicode) that result in significant performance degradation if the hardware is allowed to run with these actions.

BRIEF SUMMARY OF THE INVENTION

An embodiment of the invention is a processor for detecting one or more groups of instructions and initiating a processor action upon detecting one or more groups of instructions. The processor includes an instruction unit for fetching and decoding a group of instructions. An instruction register receives the group of instruction having at least one instruction opcode. A control register includes a control word including a control opcode and an action field defining a processor action. An execution unit includes compare logic for comparing the instruction opcode and the control opcode. The execution unit initiates the processor action upon the compare logic detecting a hit between the instruction opcode and the control opcode.

BRIEF DESCRIPTION OF THE DRAWINGS

Referring now to the drawings wherein like elements are numbered alike in the several FIGURES:

FIG. 2 illustrates the pipeline stages for the processor in an embodiment of the invention;

FIG. 3 illustrates exemplary instruction groups in the pipeline;

DETAILED DESCRIPTION OF THE PREFERRED EMBODIMENTS

Figure 1:
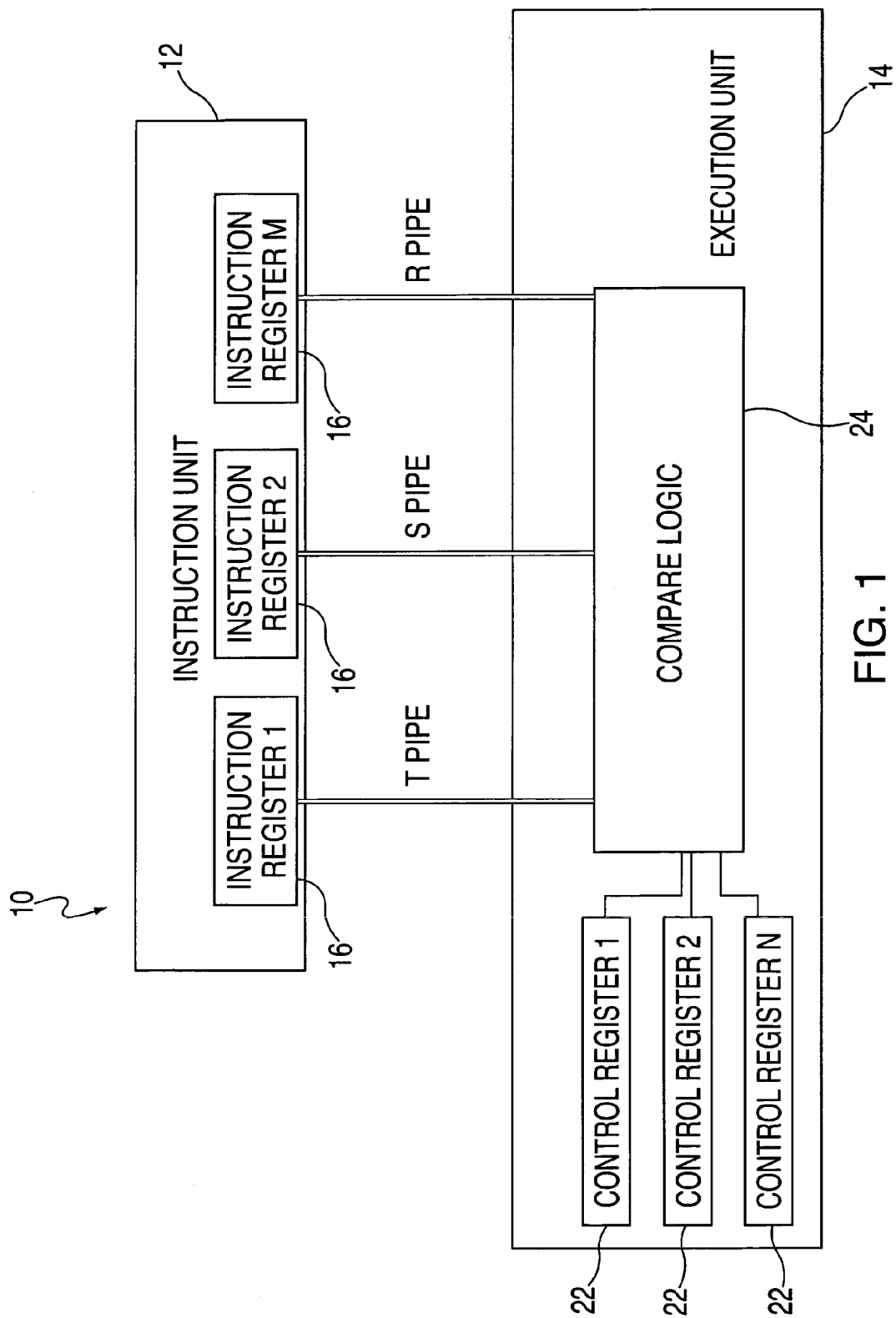
FIG. 1 is a block diagram of a processor in an embodiment of the invention.

FIG. 1 is block diagram of a computer processor 10 in an embodiment of the invention. The processor 10 includes an instruction unit 12 responsible for fetching instructions, decoding instructions and forwarding instructions to one or more execution pipes. Instruction registers 16 hold instructions until accessed by execution unit 14. In the example in FIG. 1, three execution pipes are employed, labeled R, S and T. The R pipe may be used for more complex instructions such as branch instructions.

Execution unit 14 receives instructions along the R, S and T pipes. The execution unit 14 may be a fixed point unit (FXU) capable of processing superscalar instructions. Control registers 22 contain control words used to detect predefined groups of instructions. Any number of control registers 22 may be used so that multiple groups of instructions may be detected. The execution unit 14 includes compare logic 24 that compares the instructions from instruction registers 16 to the control registers 22 and initiates certain processor actions in response to the comparison.

The processor pipeline has six stages (not counting Instruction Fetch) as shown in FIG. 2. Instructions are decoded at the instruction unit 12 in the decode stage DCD, grouped during the operand address add generation stage and issued during dispatch stage EM1.

During the GPR read stage E0, the operands are read and gated to the instruction registers 16. The instructions are executed in the execution stage EX and the results are written back in put away cycle PA. For instructions that require more than one cycle of execution, they repeat the EX stage as many cycles as they require to execute. The execution unit 14 includes opcode compare logic 24 and receives dispatched instructions in the EM1 stage and starts decoding the control lines needed in E0 and EX stages.

FIG. 3 shows an example of instruction flow through the pipeline. Cycle (EX) means an attempted EX cycle when the cycle cannot be completed due to cache miss, pending exception or a store being blocked in preceding cycles. Similarly, (E0) means an attempted E0 cycle. Instructions dispatched together will have their EM1 and E0 cycle together but may have their EX cycle and PA cycle at different times as shown in FIG. 3 for instruction group 2 where the EX cycle for the T pipe instruction is one cycle later than R and S pipes.

In an exemplary embodiment, a group of instructions is used to refer to one of more (up to the maximum allowable) instructions issued simultaneously from the instruction unit 12. For example, 3-way superscalar instructions may be issued together. An exemplary maximum instruction group contains a conditional branch issued to the R pipe, and two other non-branch superscalar instructions issued to pipes S and T. Execution unit 14 may have multiple execution pipes including a control pipe having no dataflow, execution pipes for executing most FXU instructions (e.g., arithmetic, logical and shift/rotate instructions)and a complex instruction pipe containing specialized hardware needed for executing decimal instructions, binary multiples, and other complicated instructions.

Exemplary groups of instructions include the following.

1. A superscalar branch instruction issued alone on the R pipe.
2. A non superscalar branch instruction issued on the R pipe and executed on both R and S pipes. These type of branches require dataflow execution such as loop branches.
3. Two superscalar instructions issued on the R and S pipes.

4. Three superscalar instructions issued on the R, S and T pipes.
5. A superscalar instruction issued on the S pipe.
6. Two superscalar instructions issued on the S and T pipes.
7. A non-superscalar instruction issued on the S pipe. A non-superscalar instruction refers to instructions that are issued alone for architecture and implementation reasons and/or needs both S and T pipes to execute and/or requires more than one cycle to execute.
8. A non-superscalar instruction issued on the T pipe. In one embodiment, this means that a floating point instruction is issued to the T pipe.

Instruction group types 4 and 6 may have also additional properties such as condition code forwarding, operand forwarding, store type instructions, etc.

In operation, the execution unit 14 receives instructions on the R pipe, S pipe and/or T pipe. These may be superscalar instructions, or non-superscalar instructions as noted above. Prior to executing the instruction, the compare logic 24 accesses control registers 22 to determine if the received instruction initiates a predefined processor action. As described in further detail herein, the control registers 22 identify instructions requiring predefined processor actions.

In one embodiment, the control registers 22 are 64 bit registers. If the compare logic 24 detects a predefined instruction, the execution unit 14 executes predefined processor action as defined by an action field in the 64 bit word in the control register 22.

The compare logic 24 of execution unit 14 may operate in two modes, referenced as non-sequential (mode 1) and sequential (mode 2). In mode 1, the compare logic detects a single occurrence of a group (e.g., one or more) instructions. In mode 2, the compare logic detects a sequence of two groups of instructions. In mode 2, the first group of instructions is referred to as the source group and the second group of instructions is referred to as the target group.

Exemplary bit assignments for the 64 bit word in the control registers are provide below. In the description below, the term "group" refers to the instruction group in mode 1 or the target group in mode 2.

0 Include compare in trace start/stop
1:4 A four bit field defining actions to be taken if a received instruction matches an instruction defined in the control register. Depending on its value different actions are taken.
  0 No action.
  1 Serialize before executing group.
  2 Serialize after executing group.
  3 Serialize before executing group and enter super-slow mode.
  4 Serialize after executing this group and enter super-slow mode
  5 Add one cycle delay before executing group. The E0 of this group will occur at or after the PA of the previous group.
  6 Add two cycles delay before executing this group. The E0 of this group will occur after the PA of the previous group.
  7 Add one cycle delay after executing this group. The PA cycle of this group shall occur at or before the E0 of the next group.
  8 Add two cycles delay after executing this group. The PA cycle of this group shall occur before E0 of next group.
  9 Serialize processor and force millicode execution of the instruction(s) in this group.
  10 Hold the S and T pipes instructions in the EX state for one cycle.
  11 Hold the T pipe instruction in the EX state for one cycle and allow S pipe instruction to finish.
  12 Serialize processor prior to executing this group if the previous group store data is blocked.
5:6 Detection on Branches
  0 Mask-off the R pipe instruction. i.e., ignore the instruction on the R pipe.
  1 Non Superscalar Instruction issued on the R pipe.
  2 Superscalar Instruction issued on the R pipe.
  3 R pipe is shut-off. No match possible on the R pipe. The R pipe is ignored when in non-grouped mode.
7:18 12-bit opcode A.
19:30 12-bit opcode B.
31:42 12-bit mask for opcode A. If a bit in the mask is '0', its corresponding opcode bit is masked-off in the comparison.
43:54 12-bit mask for opcode B.
55 Group is active when there is condition code forwarding.
56 Group is active when there is GPR forwarding.
57:60 Other qualifiers.
61 Match if there is GPR or AR dependencies.
62 '0' indicates mode 1;'1' indicates mode 2
63 When '1' register is in grouped mode. When '0' register is in non-grouped mode.

In operation, the compare logic 24 operates to detect non-grouped instructions or grouped instructions. When detecting non-grouped instructions, the compare logic will indicate a "hit" when an instruction having either opcode A or opcode B is present. When detecting grouped instructions, the compare logic 24 will indicate a hit when both an instruction having opcode A and an instruction having opcode B is present. The compare logic 24 is placed in grouped mode or ungrouped mode by controlling bit 63 in the control registers 22.

Further, the compare logic 24 may also take action depending on whether a particular sequence of instructions has been received. In the non-sequential mode, any hit will cause the processor to implement the processor action defined by bits 1-4. In a sequential mode, the instructions causing the hit must be present in a predefined order in order to initiate the action defined by bits 1-4.

Figure 4:
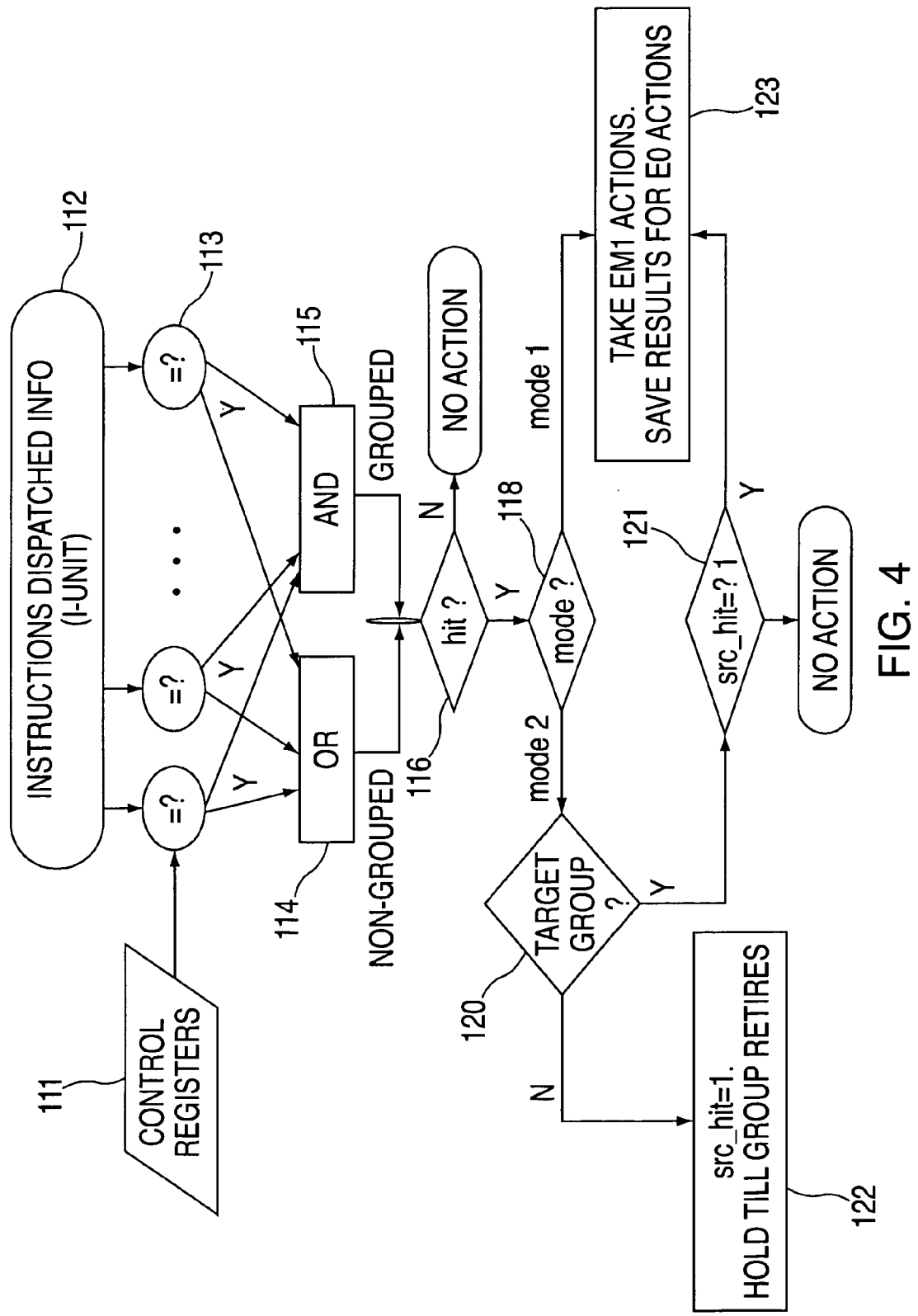
FIG. 4 illustrates an overall flowchart of the opcode compare logic.

FIG. 4 shows an overall flowchart of the opcode compare method. Instruction opcodes are dispatched from the I-unit in EM1 cycle at step 112 and compared at 113 to the opcodes in control registers shown at 111. The results of these compares are either ORed together at 114 for non-grouped mode or ANDed togther at 115 for grouped mode. A hit is indicated if the result of OR operation or the AND operation results in a positive results (e.g., a logical 1). If there is a hit at step 116, the mode of the register is checked.

The mode designated by the control register 22 is designated at step 118. In non-sequential mode (depicted as mode 1), this hit results in an action being taken at step 123 as defined by bits 1-4 of the control register 22. Such action may occur in the EM1 stage, E0 and EX stages. In sequential mode, depicted as mode 2, another check is made at step 120 to determine if this hit corresponds to source group of the sequence or the target group of the sequence. If this the hit is for a target group, and there is already an active source group hit as determined at step 121, a processor action is taken at step 123 as defined by bits 1-4 of the control register 22. If the hit corresponds to source group, then flow proceeds to step 122 where a source hit indicator, src_hit, is set to 1 and held until the group of instructions is processed.

Figure 5:
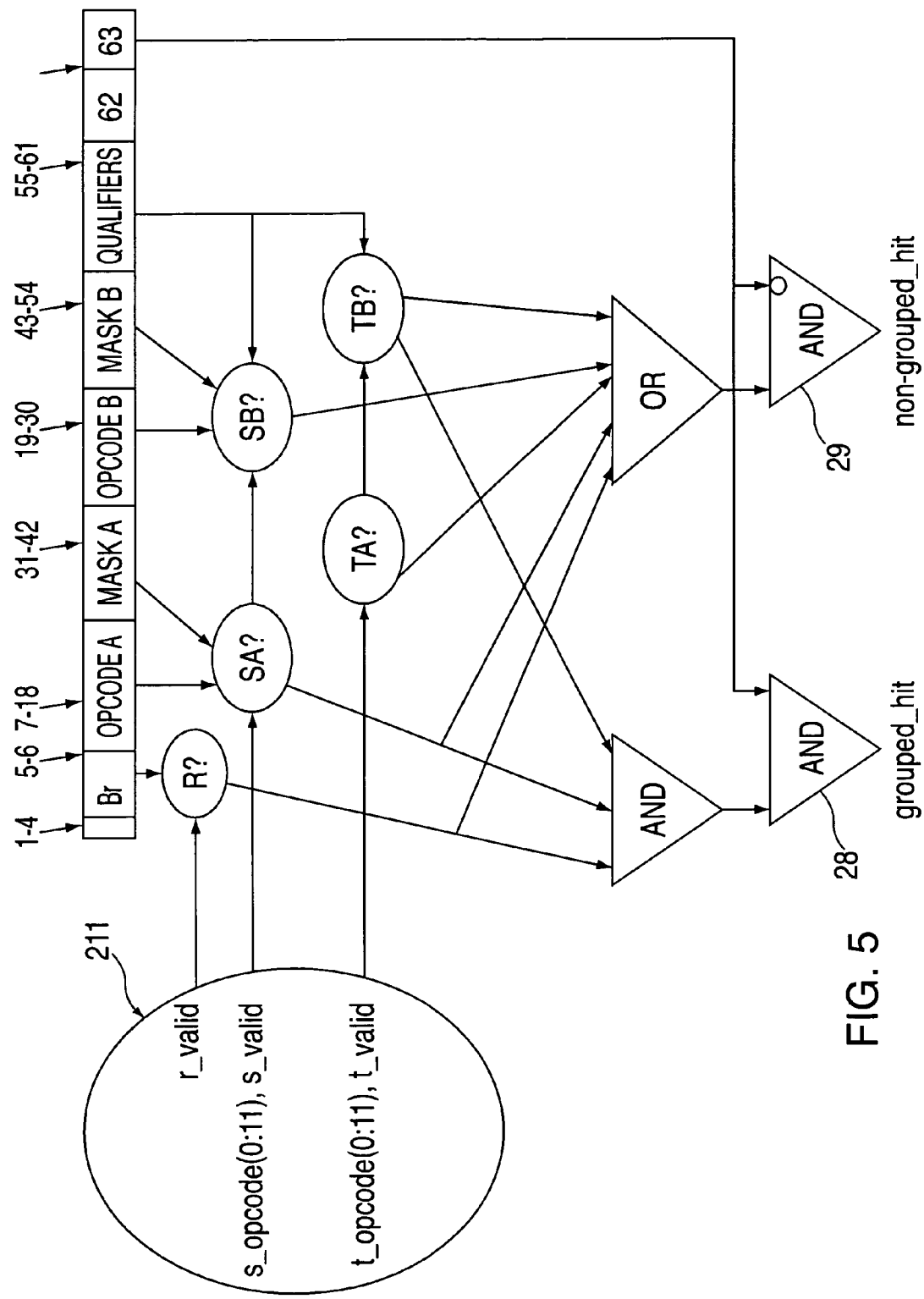
FIG. 5 illustrates exemplary compare logic.

Detection of certain instructions, thereby generating a hit at step 116 of FIG. 4, may be achieved in a number of ways. FIG. 5 shows a diagram of exemplary compare logic 24 operations between the opcodes received from the I-unit 12 and the opcodes stored into the control registers 22. The opcode of the branch instructions issued on the R pipe are not compared to opcodes in the control registers. Rather, a compare is made to determine if a superscalar instruction has been dispatched to the R pipe.

Bits 5 and 6 of the control register 22 are set to detect different types of branch instructions. All superscalar branches are treated as one group and not differentiated by opcode. For non-superscalar branches when the branch is issued to both R and S pipe, SA (described below) can be used to detect a certain branch. There are two types of branch detection, one is used for grouped mode and the other used for non-grouped mode.

In either grouped mode or non-grouped mode, the branch detection is represented as R? in FIG. 5. In grouped mode, branch detection is represented by variable grouped_hit_R which is defined by the following logical expression:

(register_bits(5:6)="00") OR
((register_bis(5:6)="01") AND r_and_s_dispatch) OR
((register_bis(5:6)="10") AND r_dispatch).

In non-grouped mode, branch detection is represented by variable non_grouped_hit_R which is defined by the following logical expression:

((register_bis(5:6)="01") AND r_and_s_dispatch AND SA) OR
((register_bis(5:6)="10") AND r_dispatch).

As described previously, bits 5 and 6 on the control registers 22 control detection of branch instructions. To mask-off the R pipe, register_bits(5:6) are set to "00 " and then grouped_hit_R will be always ON.

The values SA, SB, TA and TB represent the comparison of opcodes of instructions received on either the S or T pipes and opcodes in control registers 22. Each value is described in further detail as flows.

SA represents the result of a comparison between the opcode of the instruction received on the on S pipe sent from instruction unit 12 and opcode A in bits 7-18 of the control register 22 under the control of bit mask A (bits 31-42). When a bit in the mask is '0', its corresponding bit compare between s_opcode and opcode A is ignored. The mask bits are used so that opcode A can be used for a series of opcodes and not just single opcode. For example, if opcode A equals to hexadecimal value "FAA", and mask A="FFE" then SA will be set of s_opcode="FAA" or "FAB", which is same as making the least significant bit in the opcode. When mask A is all 0's, SA is always set.

SB represents a comparison between the opcode of the instruction on the S pipe sent from instruction unit 12 and opcode B in bits 19-30 in the control register 22 under the control of mask B (bits 43-54). When mask B is all 0's, SB is always ON.

TA represents a comparison between the opcode on the T pipe sent from I-unit and opcode A in bits 7-18 in the control register 22 under the control of mask A (bits 31-42). When mask A is all 0's, TA is always ON.

TB represents a comparison between the opcode on the T pipe sent from I-unit and opcode B in bits 19-30 in the control register 22 under the control of mask B (bits 43-54). When mask B is all 0's, TB is always ON.

As shown at 211, various inputs are provided to determine R, SA, SB, TA and TB. The variable r_valid indicates whether an instruction (typically a branch) has been dispatched to the R-pipe. If so, then r_dispatch is true. Similarly, s_valid and t_valid indicate whether an instruction has been dispatched on the S and T pipes, respectively.

The existence of a hit, as shown in step 116 of FIG. 4, is represented by variable group_hit at AND gate 28 for grouped mode or non-grouped_hit at AND gate 29 for non-grouped mode. These variables have the following logical expressions:

grouped_hit=(grouped_hit_R and SA and TB)

non-grouped_hit=(non_grouped_hit_R or SA or SB or TA or TB).

Bit 63 of control register controls whether AND gate 28 or AND gate 29 is active. If bit 63 is 1, indicating grouped mode, AND gate 28 is active and AND gate 29 outputs 0 due to the inverted input of bit 63 to AND gate 29. Conversely, if bit 63 is 0, then AND gate 28 outputs 0 and AND gate 29 is active.

Bits 55 to 61 are qualifiers that are added to the basic opcode compares. If a qualifier bit is ON, the condition of that qualifier has to be met before any action is taken. Exemplary qualifiers include condition code forwarding, operand forwarding, data dependency between groups of instructions, data cache busy for stores or reads, pending exceptions, etc.

For example, if opcode A=opcode for MVC instruction, opcode B=opcode for CVD instruction, and the control register is programmed to non-grouped mode (bit 63=0)and non-sequential mode 1 (bit 62=0), then this control register 22 will cause a hit each time an MVC or CVD instruction is dispatched to the FXU.

Embodiments of the invention provides a system and a method for implementing opcode compares in a superscalar processor. The invention has many advantages over existing techniques. Embodiments of the invention apply to superscalar processor designs. Embodiments of the invention allow the detection of a group of instructions (dispatched simultaneously) and is not limited to just one opcode. Embodiments of the invention allow the detection of a sequence of two groups of instructions. In other words, a detection occurs if a group of instructions is followed by another group and these two groups overlap in time. Embodiments of the invention allow multiple actions to be taken including adding variable delay cycles (e.g., 1 or 2 cycles) between groups on instructions. Embodiments of the invention break up the group by allowing older instruction(s) to execute while holding the younger instruction(s) in execution stage.

Embodiments of the invention allow each programmable control register to be programmed to work in a "grouped" vs. "non-grouped" instruction mode. In grouped mode, each opcode control register is dedicated for detection of one group. In non-grouped mode, the control register is capable of detecting multiple different instructions which may or may not be superscalar.

Embodiments of the invention allow the use of qualifiers in addition to opcode comparisons before an action is taken.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for detecting one or more groups of instructions and initiating a processor action upon detecting one or more groups of instructions, the method comprising:

fetching and decoding a group of instructions, said group of instruction having at least one instruction opcode;

defining a control word including a control opcode and an action field defining said processor action;

comparing said instruction opcode and said control opcode, initiating said processor action upon detecting a hit between said instruction opcode and said control opcode;

wherein;

said control word includes multiple control opcodes and a field indicating grouped mode or non-grouped mode;

in grouped mode, said comparing indicates a hit if all of said control opcodes are present in said instruction opcodes of said group of instructions;

in non-grouped mode, said comparing indicates a hit if one of said control opcodes is present in said instruction opcodes of said group of instructions.

2. The method of claim 1 wherein:

said control word includes multiple control opcodes and a field indicating sequential mode or non-sequential mode;

in sequential mode, said comparing initiates said processor action upon detecting a hit if said control opcodes are present in said instruction opcodes of said group of instructions in a predefined sequence;

in non-sequential mode, said comparing initiates said processor action upon detecting a hit.

3. The method of claim 1 wherein:

said control word includes multiple control opcodes and a field indicating sequential mode or non-sequential mode;

in sequential mode, said comparing initiates said processor action upon detecting a hit and if said control opcodes are present in said instruction opcodes of said group of instructions in a predefined sequence;

in non-sequential mode, said comparing initiates said processor action upon detecting a hit.

4. The method of claim 1 wherein:

said processor action includes serializing instruction processing before executing said group of instructions.

5. The method of claim 1 wherein:

said processor action includes serializing instruction processing after executing said group of instructions.

6. The method of claim 1 wherein:

said processor action includes inserting a delay before executing said group of instructions.

7. The method of claim 1 wherein:

said processor action includes inserting a delay after executing said group of instructions.

8. The method of claim 1 wherein:

said processor action includes holding execution of said group of instructions for a number of cycles.

9. The method of claim 1 wherein:

said control word includes a control qualifiers, said control qualifier defining a condition to be met before said processor action.

* * * * *